US008886025B2

United States Patent
Nakano

(10) Patent No.: US 8,886,025 B2
(45) Date of Patent: Nov. 11, 2014

(54) LASER FILM HEATING APPARATUS

(75) Inventor: Shoji Nakano, Okayama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/234,608

(22) PCT Filed: Aug. 3, 2012

(86) PCT No.: PCT/JP2012/004955
§ 371 (c)(1),
(2), (4) Date: Jan. 23, 2014

(87) PCT Pub. No.: WO2013/031094
PCT Pub. Date: Mar. 7, 2013

(65) Prior Publication Data
US 2014/0153911 A1    Jun. 5, 2014

(30) Foreign Application Priority Data

Aug. 30, 2011    (JP) ................................. 2011-187204

(51) Int. Cl.
| F26B 13/10 | (2006.01) |
| B29D 7/01 | (2006.01) |
| G11B 5/84 | (2006.01) |
| H05B 3/00 | (2006.01) |
| B29B 13/02 | (2006.01) |
| B29C 35/08 | (2006.01) |

(52) U.S. Cl.
CPC ............... *H05B 3/009* (2013.01); *B29B 13/023* (2013.01); *G11B 5/84* (2013.01); *B29C 2035/0838* (2013.01)
USPC .......................................... 392/417; 219/388

(58) Field of Classification Search
None
See application file for complete search history.

(56) References Cited

U.S. PATENT DOCUMENTS

| 5,587,767 A | 12/1996 | Islam et al. |
| 5,717,191 A * | 2/1998 | Christensen et al. ......... 219/634 |
| 6,130,408 A * | 10/2000 | Fukuda et al. ................ 219/216 |

(Continued)

FOREIGN PATENT DOCUMENTS

| JP | 08-320544 A | 12/1996 |
| JP | 2000-141474 A | 5/2000 |

(Continued)

OTHER PUBLICATIONS

International Search Report issued in International Application No. PCT/JP/2012/004955 with Date of mailing Oct. 30, 2012.

(Continued)

*Primary Examiner* — Thor Campbell
(74) *Attorney, Agent, or Firm* — McDermott Will & Emery LLP

(57) ABSTRACT

A heating apparatus includes a film feed mechanism, a laser light source, a laser irradiation component, and a laser controller. The film feed mechanism has a film contact surface that contacts with one surface of a film material, and moves the film material in the lengthwise direction of the film material. The laser irradiation component emits a laser beam toward the film contact surface. The film contact surface has a first contact surface and second contact surfaces, a material forming the first surface having a different thermal conductivity that a material forming the second surfaces. The second contact surfaces are disposed at positions that come into contact with the ends of the film material in the width direction, while the first contact surface is disposed between the second contact surfaces. The material forming the first contact surface has a lower thermal conductivity than the material forming the second contact surfaces.

10 Claims, 8 Drawing Sheets

(56) References Cited

U.S. PATENT DOCUMENTS

| | | |
|---|---|---|
| 2007/0147861 A1* | 6/2007 | Takayanagi .................... 399/45 |
| 2007/0195834 A1* | 8/2007 | Tanaka et al. ................... 372/24 |
| 2009/0218732 A1* | 9/2009 | Cron et al. ................ 264/342 R |

FOREIGN PATENT DOCUMENTS

| | | |
|---|---|---|
| JP | 2006-062201 A | 3/2006 |
| JP | 2006-274336 A | 10/2006 |
| JP | 2009-262484 A | 11/2009 |

OTHER PUBLICATIONS

Written Opinion issued in International Application No. PCT/JP2012/004955 with English Translation with Date of mailing Oct. 30, 2012.

* cited by examiner

LASER FILM HEATING APPARATUS

RELATED APPLICATIONS

This application is the U.S. National Phase under 35 U.S.C. §371 of International Application No. PCT/JP2012/004955, filed on Aug. 3, 2012, which in turn claims the benefit of Japanese Application No. 2011-187204, filed on Aug. 30, 2011, the disclosures of which Applications are incorporated by reference herein.

TECHNICAL FIELD

The disclosure relates to a heating apparatus in which a magnetic tape, a phase-change recording film, or another such film-form recording medium is moved at a constant feed rate and irradiated with a line laser beam to heat the film.

BACKGROUND ART

Patent Literature 1 discloses a method for heating steel plate in a direct heat type of continuous heating furnace, which makes the temperature distribution in the width direction of the steel plate uniform. With this heating method, the steel plate is continuously passed through and heated in a direct heat type of continuous heating furnace. In this heating, prior to passing the plate through the direct-heat continuous heating furnace, the front and/or back side in the middle of the steel plate is coated with a substance having a emissivity that is higher than the emissivity of the steel plate. As a result, there is more radiant heat inputted to the middle part of the steel plate in the width direction, than at the edges. With this heating method, excessive heat is suppressed at the ends of the steel plate in the width direction, and this also promotes a rise in the temperature in the middle part, which makes the temperature distribution in the width direction of the steel plate more uniform.

CITATION LIST

Patent Literature

Patent Literature 1: Japanese Laid-Open Patent Application 2006-274336

SUMMARY

Technical Problem

The present disclosure provides a heating apparatus and a heating method with which unevenness in the temperature distribution in the width direction of a heated film is suppressed in the manufacture of a film-form recording medium.

Solution to Problem

The heating apparatus disclosed herein is a heating apparatus that heats an elongated film material by irradiating the film material with a laser beam in manufacture of a film-form recording medium, said heating apparatus comprising a film feed mechanism having a film contact surface that contacts with one surface of the film material, the film feed mechanism being configured to move the film material mounted thereon in a longitudinal direction of the film material, a laser light source, a laser irradiation component disposed opposite the film contact surface, the laser irradiation component being configured to emit a laser beam from the laser light source toward the film contact surface, and a laser controller configured to control emission of the laser beam. The film contact surface includes a first contact surface and second contact surfaces, a material forming the first contact surface having a different thermal conductivity than a material forming the second contact surfaces. The second contact surfaces are disposed at positions that come into contact with ends of the film material in a width direction that is perpendicular to the longitudinal direction, and the first contact surface is disposed between the second contact surfaces. The material forming the first contact surface has a lower thermal conductivity than the material forming the second contact surfaces.

The heating apparatus disclosed herein is a heating apparatus that heats an elongated film material by irradiating the film material with a laser beam in manufacture of a film-form recording medium, said heating apparatus comprising a film feed mechanism having a film contact surface that contacts with one surface of the film material, the film feed mechanism being configured to move the film material mounted thereon in a longitudinal direction of the film material, a laser light source, a laser irradiation component disposed opposite the film contact surface, the laser irradiation component being configured to emit a laser beam from the laser light source toward the film contact surface, and a laser controller configured to control emission of the laser beam. The laser irradiation component is configured to irradiate the film contact surface with a laser spot. The laser controller is configured to control the laser irradiation component so that the laser spot moves back and forth at two ends of the film contact surface in a width direction that is perpendicular to the longitudinal direction, at a higher speed than the laser spot moves back and forth at a middle part of the film contact surface disposed between the two ends.

Advantageous Effects

With the above configuration, unevenness in the temperature distribution in the width direction of a heated film is suppressed in the manufacture of a film-form recording medium.

DESCRIPTION OF EMBODIMENTS

Embodiments will now be described in detail through reference to the drawings as needed. However, unnecessarily detailed descriptions may be omitted in some cases. For instance, duplicate description of components that are substantially the same, or detailed description of things that are already well known may be omitted. The purpose of this is to keep the description from becoming needlessly redundant, and to facilitate an understanding on the part of a person skilled in the art.

The inventors have provided the appended drawings and the following description in order that a person skilled in the art may fully understand what is disclosed herein, and do not intend for these to limit the subjects of the patent claims.

What is disclosed below prevents heat damage to the ends of a film in its width direction in an initialization step of using a laser beam to crystallize an amorphous recording film of a phase-change recording film, and suppresses unevenness in the temperature distribution in the width direction of the film.

Embodiments will now be described in detail through reference to the drawings.

Embodiment 1

1-1. Configuration
1-1-1. Configuration of Laser Annealing Device

Figure 1:
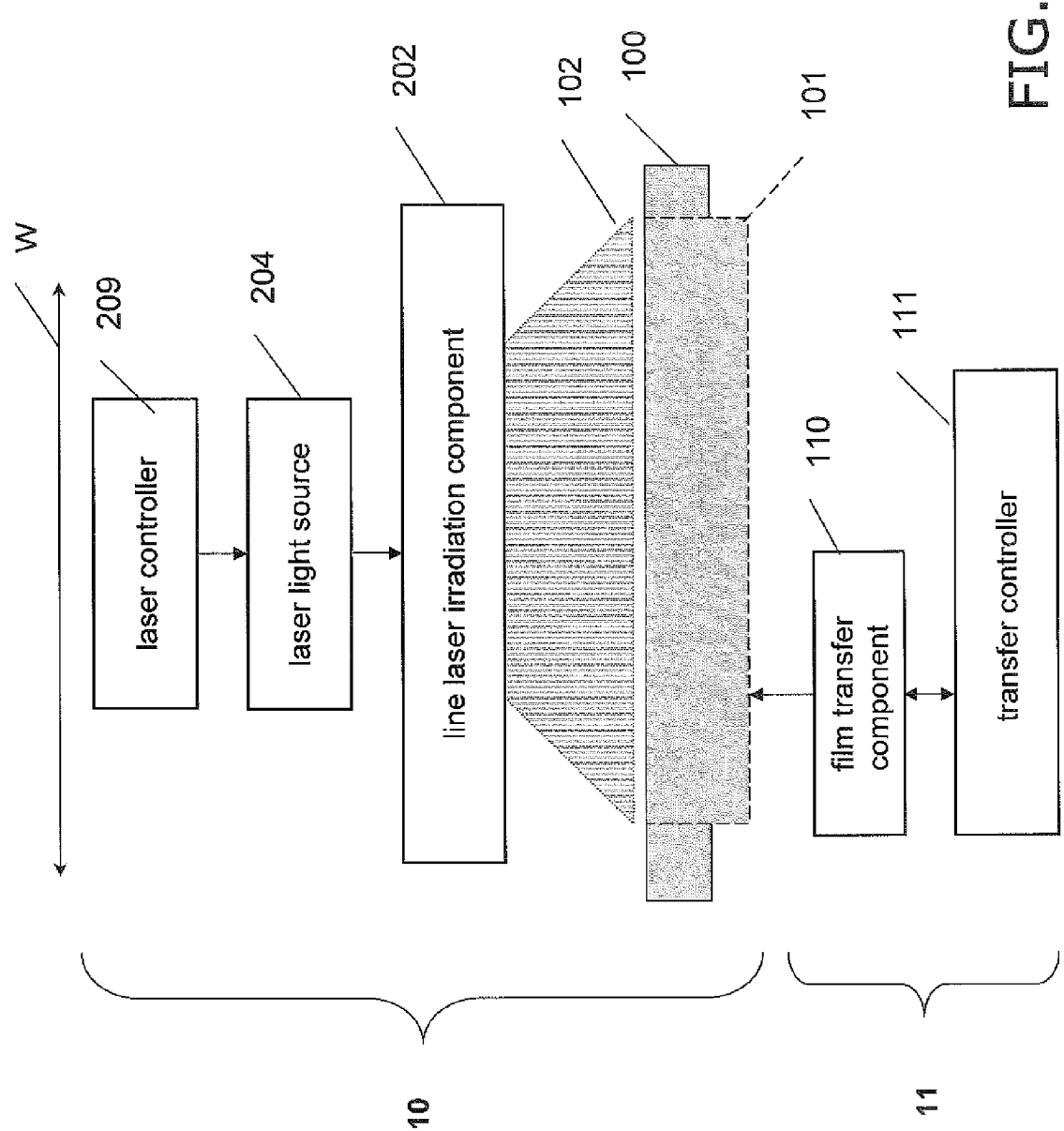
FIG. 1 is a simplified diagram of the entire laser annealing device in Embodiment 1.

FIG. 1 is a simplified diagram of the configuration of a laser annealing device 10 (an example of a heating apparatus) in this embodiment, and of part of the configuration of a film transfer device 11.

The laser annealing device 10 uses a line laser beam 102 of a specific power to anneal a film 101 (an example of a film material) used for manufacturing a film-form recording medium. As shown in FIG. 1, the laser annealing device 10 comprises a line laser irradiation component 202 (an example of a laser irradiation component), a laser light source 204 (an example of a laser light source), a laser controller 209 (an example of a laser controller), and a roller 100 (an example of a film feed mechanism).

The line laser irradiation component 202 comprises a minor, lens, and other such optical system parts. The line laser irradiation component 202 includes, for example, a collimating lens that makes the laser beam emitted from the laser light source 204 into a parallel light beam, and a cylindrical lens having an optical axis perpendicular to the optical axis of the collimating lens. The line laser irradiation component 202 is formed so that the laser beam from the laser light source 204 expands along the width direction of the film 101 (along the arrow W in FIG. 1). The line laser beam 102 thus formed is directed at the film 101.

A YVO4 laser, a semiconductor laser, a YAG laser, or the like having a wavelength in the near-infrared region (0.7 to 2.5 μm), which achieves good heating properties, is used for the laser light source 204, for example.

The laser controller 209 performs control of the laser power of the laser light source 204 (such as switching the laser irradiation on and off and setting the laser power), focus control, operation control of the laser drive mechanism, and so forth. The laser controller 209 is an integrated circuit or device including a processor and memory, for example, and is realized by a multipurpose DSP, FPGA, or the like that executes programs stored in the memory.

The laser beam is emitted by the laser light source 204, and its power is controlled by the laser controller 209. The laser beam is then made into a parallel light beam, for example, by the optical system of the line laser irradiation component 202, and is then spread out in the width direction of the film 101 by a lens, forming the line laser beam 102 shown in FIG. 1. The line laser beam 102 irradiates the film 101 while the film 101 is being transferred.

The film transfer device 11 comprises a film transfer component 110 and a transfer controller 111. The film transfer component 110 is a transfer belt, a drive roller, or another such drive mechanism, for example, and when driven, moves the film 101 in a specific direction. The transfer controller 111 is a device that includes a processor and memory, etc., for controlling the drive of the film transfer component 110.

1-1-2. Configuration of Roller

The roller 100 is designed to be rotatable. The roller 100 has a film contact surface that comes into contact with the back of the film 101 being transferred by the film transfer component 110. The roller 100 rotates with the film 101 wound around it. The film 101 is sent out in the lengthwise direction without slipping because of the friction with the film contact surface of the roller 100. The roller 100 also has a low thermal conductivity portion 104 (an example of a first contact surface) that contacts with the middle part in the width direction of the film 101, and high thermal conductivity portions 103 and 105 (an example of second contact surface) that contacts with both ends of the film 101. The low thermal conductivity portion 104 is made of a material with a low thermal conductivity. The high thermal conductive portions 103 and 105 are made of a material with a high thermal conductivity. For example, the low thermal conductivity portion 104 is made of a plastic material such as polyacetal with a thermal conductivity of about 0.23 W/(m·k), stainless steel with a thermal conductivity of about 16.7 to 20.9 W/(m·k), or another such material with low thermal conductivity, and the high thermal conductivity portions 103 and 105 are made of aluminum with a thermal conductivity of about 236 W/(m·k), copper with a thermal conductivity of about 398 W/(m·k), or another such material with a high thermal conductivity.

Figure 2:
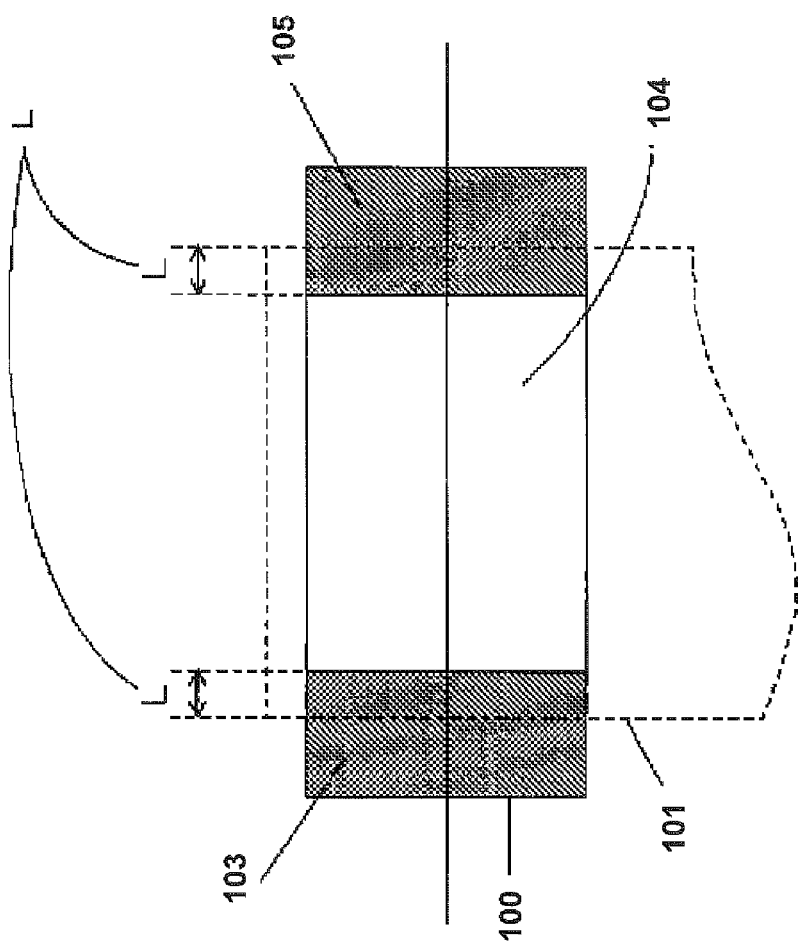
FIG. 2 shows the layout of the roller and the film in the laser annealing device.

FIG. 2 shows the layout of the roller 100 and the film 101. The regions of the film 101 with the dimension L (mm) from the ends (specific regions at both ends in the width direction) are in contact with the high thermal conductivity portions 103 and 105 of the roller 100. The middle portion of the film 101, which is sandwiched between these specific regions at the ends, is in contact with the low thermal conductivity portion 104 of the roller 100.

1-2. Operation

Figure 3:
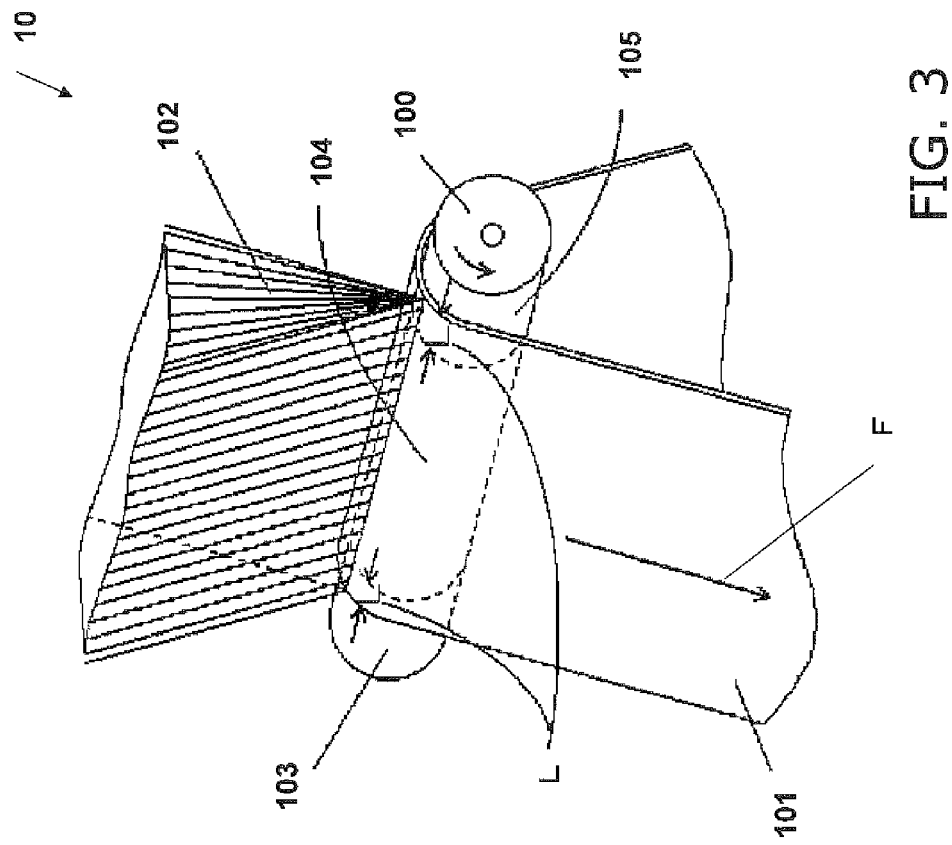
FIG. 3 shows the main components of the laser annealing device in Embodiment 1.

FIG. 3 shows the main components of the laser annealing device 10 in this embodiment.

As shown in FIG. 3, the film 101 is wound around the roller 100 so that the back of the film 101 is in contact with the roller 100. The film 101 is sent out in a specific direction (the direction of arrow F in FIG. 3) by the film transfer device 11. At this point, the back of the film 101 is touching the film contact surface of the roller 100, creating a specific frictional force, so the film 101 rotates with the roller 100 without slipping. As the film 101 is moved, it is irradiated with the line laser beam 102, which is controlled to a specific power level. The line laser beam 102 irradiates the film 101 in its entire width direction at the region where the back of the film 101 is touching the roller 100. This quickly raises the temperature of the portion of the film 101 being irradiated with the laser, and the film 101 passing through the line laser beam 102 is annealed.

When the film 101 on the roller 100 is irradiated over the entire width direction by the line laser beam 102, with a thin material such as a film the heat readily escapes to the roller 100 in contact with the back of the film. Since the film 101 near the ends is touching the high thermal conductivity portions 103 and 105, the heat escapes there more readily than in the middle part touching the low thermal conductivity portion 104, so the temperature of the film 101 near the ends is less apt to rise. This configuration prevents thermal damage that would arise from the edge effect, in which the ends become hotter.

Meanwhile, the majority of the middle part (in the width direction) of the film 101 on the roller 100 is in contact with the low thermal conductivity portion 104 of the roller 100. Therefore, the film 101 as a whole has an adiabatic structure in which heat does not readily escape from the back of the film 101 to the roller 100. Because of this configuration, thermal energy emitted by the line laser beam 102 is used effectively to heat the film 101. Thus, while thermal damage at the film ends is prevented, uniformly annealing the film over its entire width can be performed. Thus, in this embodiment, efficient and economical annealing is possible.

If the temperature of the roller 100 rises when the laser annealing device 10 is used for an extended period, a means for blowing compressed air onto the roller for cooling may be added, for example.

1-3. Effect, etc.

As described above, in this embodiment, the laser annealing device 10, which heats by irradiating the elongated film 101 with a laser beam in the manufacture of a film-form recording medium, comprises the roller 100, which has a film contact surface that contacts with one side of the film 101 and which is wound with the film 101 and moves the film 101 in its lengthwise direction; the laser light source 204; the line laser irradiation component 202, which is disposed opposite the film contact surface and emits the line laser beam 102 from the laser light source 204 toward the film contact surface; and the laser controller 209, which controls the emission of the line laser beam 102. The film contact surface of the roller 100 includes the low thermal conductivity portion 104 and the high thermal conductivity portions 103 and 105, the material forming the low thermal conductivity portion 104 having a different thermal conductivity than the material forming the high thermal conductivity portions 103 and 105. The high thermal conductivity portions 103 and 105 are disposed at positions in contact with the ends in the width direction of the film 101, which is perpendicular to the lengthwise direction, and the low thermal conductivity portion 104 is disposed in between the high thermal conductivity portions 103 and 105. The low thermal conductivity portion 104 is formed from a material whose thermal conductivity is lower than that of the high thermal conductivity portions 103 and 105. With this laser annealing device 10, the majority of the middle part (in the width direction) of the film 101 wound around the roller 100 is in contact with the low thermal conductivity portion 104 of the roller 100, so the film 101 as a whole has an adiabatic structure in which heat does not readily escape from the back of the film 101 to the roller 100. On the other hand, the film 101 near the ends is in contact with the high thermal conductivity portions 103 and 105, so at the ends of the film 101, the heat escapes to the roller 100 more readily, and the film temperature rises less than in the middle part touching the low thermal conductivity portion 104. As a result, thermal damage to the ends due to the edge effect, in which the ends become hotter when a wide sheet or film is heated, is prevented, and the film can be uniformly annealed over its entire width.

Also, in this embodiment, there is no need to coat the middle front or back of the steel plate with a specific substance as in the past, such as in the heating method in the above-mentioned Patent Literature 1, so there is no need to remove the substance after heating, and the manufacturing cost can be reduced. Furthermore, there is no risk of fouling the surrounding environment by spraying the substance, or of distorting the film material by the substance coating.

Embodiment 2

Figure 4:
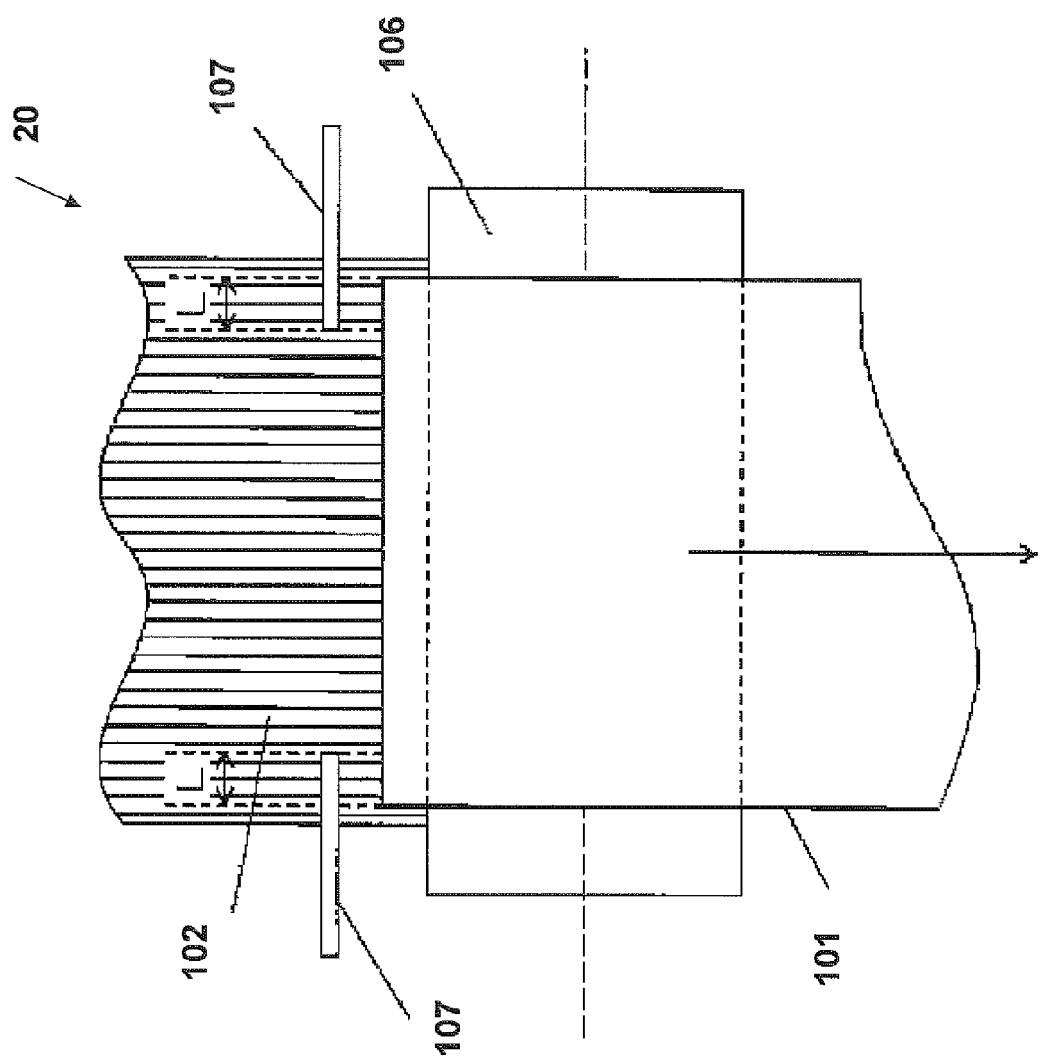
FIG. 4 shows the main components of the laser annealing device in Embodiment 2.

FIG. 4 shows the main components of the laser annealing device 20 in this embodiment. Duplicated description of components that are substantially the same as in Embodiment 1 may be omitted here.

The laser annealing device 20 in this embodiment differs from Embodiment 1 in having a roller 106 made from a single type of material. The roller 106 is preferably made from a low thermal conductivity portion in order to use the laser energy more effectively. The low thermal conductivity material is, for example, a plastic material such as polyacetal with a thermal conductivity of about 0.23 W/(m·k), stainless steel with a thermal conductivity of about 16.7 to 20.9 W/(m·k), or another such material with low thermal conductivity. As shown in FIG. 4, the laser annealing device 20 in this embodiment has attenuator plates 107 that attenuate the amount of light of the line laser beam 102 and are installed at positions corresponding to a region that is at a distance L (mm) from the film ends and is near both ends in the width direction of the film 101.

In this embodiment, the attenuator plates 107 are provided at positions corresponding to both ends of the film 101 wound around the roller 106. With this configuration, the laser beam is emitted through the attenuator plates 107 near the ends of the film 101, where the temperature tends to rise due to the edge effect. Thus, the laser intensity can be attenuated at the ends of the film 101, so there is less rise in temperature and less unevenness in the temperature distribution in the width direction of the film 101.

Embodiment 3

Figure 5:
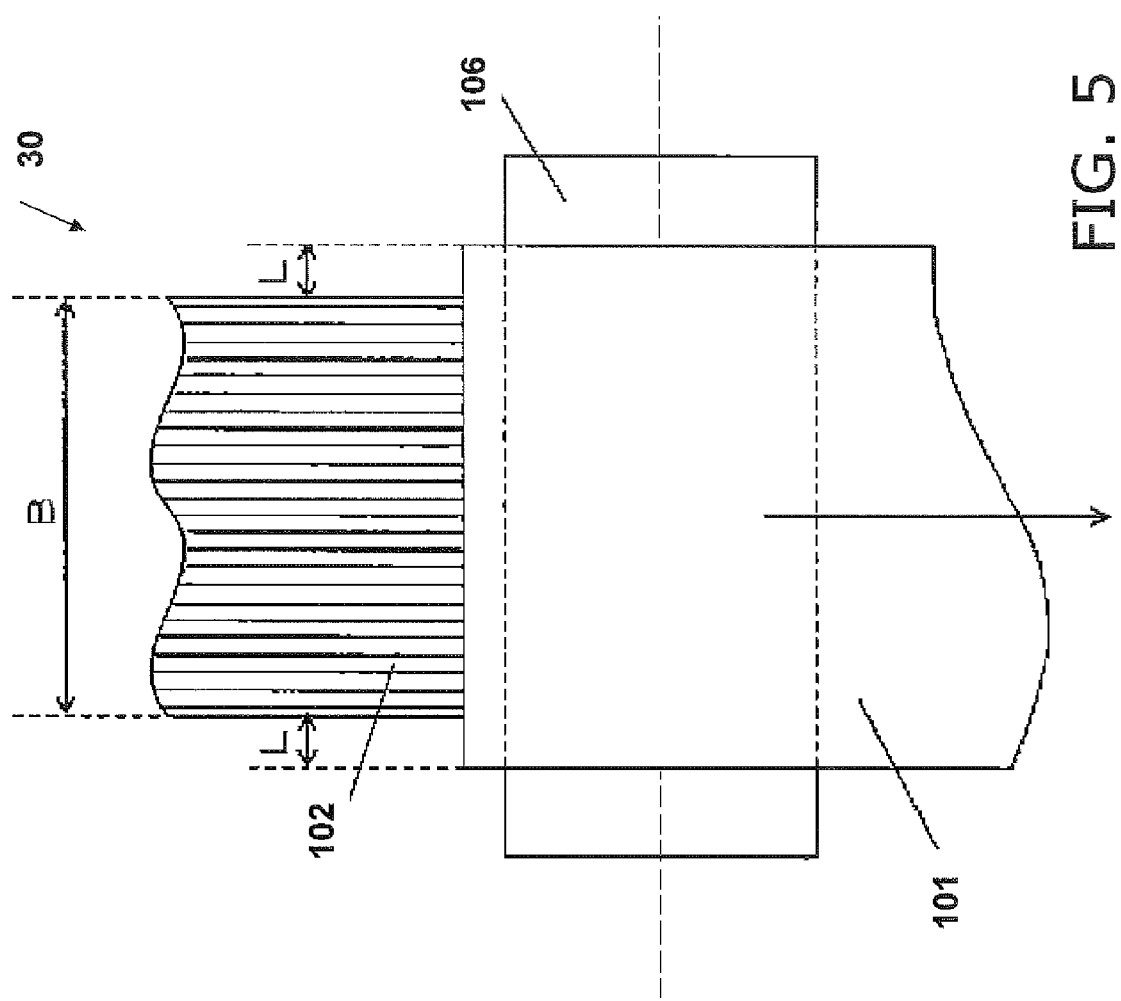
FIG. 5 shows the main components of the laser annealing device in Embodiment 3.

FIG. 5 shows the main components of a laser annealing device 30 in this embodiment. Here, duplicate description of components that are substantially the same as in Embodiment 2 may be omitted.

Just as in Embodiment 2, the laser annealing device 30 in this embodiment uses the roller 106 made of one type of material (a low thermal conductivity material). The line laser beam 102 is emitted such that the length B (mm) of the film 101 in the width direction is set to be less than the width of the film 101 by L (mm) from ends.

Thus irradiating with the laser line beam 102 reduces the temperature rise at the ends of the film 101 and affords a uniform temperature distribution.

Embodiment 4

4-1. Configuration

Figure 6:
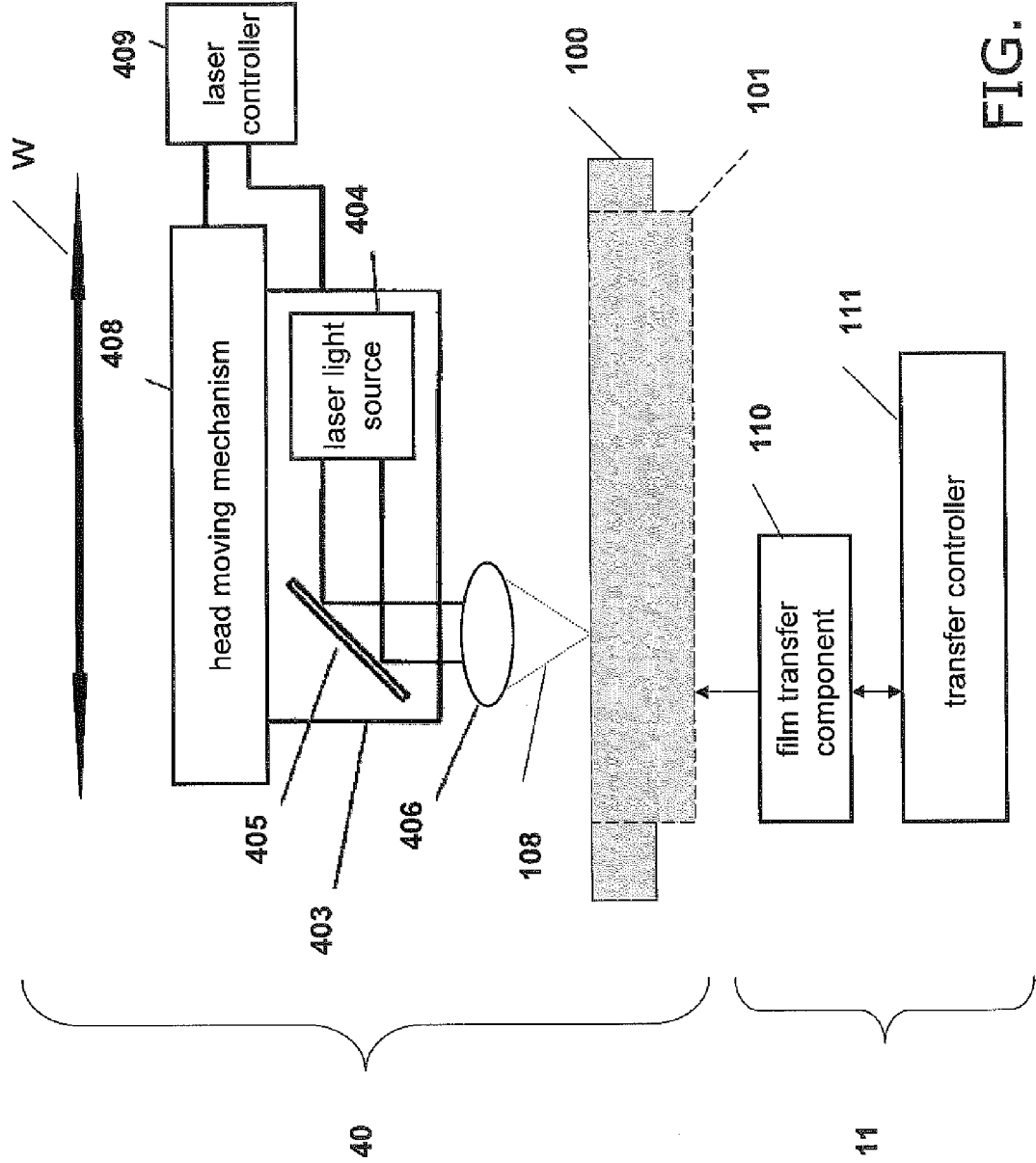
FIG. 6 is a simplified diagram of the entire laser annealing device in Embodiment 4.

FIG. 6 is a simplified diagram of the configuration of a laser annealing device 40 (an example of a heating apparatus) in this embodiment, and part of the configuration of the film transfer device 11.

The laser annealing device 40 anneals the film 101 on the roller 100 by moving a laser spot 108 (produced at a specific power level) back and forth linearly at a constant speed in the width direction of the film 101. As shown in FIG. 6, the laser annealing device 40 comprises an optical pickup 403 (an example of a laser irradiation component), a laser light source 404, a minor 405, an objective lens 406, a head moving mechanism 408, a laser controller 409, and the roller 100.

The optical pickup 403 is made up of the laser light source 404 and an optical system comprising the mirror 405, the objective lens 406, and so forth. The direction of the laser spot 108 emitted from the laser light source 404 is changed by the minor 405 so that the spot irradiates the film 101 via the objective lens 406.

A YAG laser, YVO4 laser, semiconductor laser, or the like having a wavelength in the near-infrared region (0.7 to 2.5 μm) and with good heating properties is used as the laser light source 204, for example.

The head moving mechanism 408 moves the optical pickup 403 in the width direction of the film 101 (along the arrow W direction in FIG. 6), using a pulse motor, a servo motor, a linear motor, or the like (not shown) as a drive source, and outputs position information about the optical pickup 403 to the laser controller 209.

The laser controller 409 controls movement of the head moving mechanism 408, focusing of the optical pickup 403, adjustment of the laser power of the laser light source 404, and so on. The laser controller 409 is an integrated circuit or a device including a processor and memory, for example, and is realized by a multipurpose DSP, FPGA, or the like that executes programs stored in the memory.

The film transfer device 11 comprises the film transfer component 110 and the transfer controller 111. The film transfer component 110 is a transfer belt, a drive roller, or another such drive mechanism, for example, and when driven, moves the film 101 in a specific direction. The transfer controller 111 is a device that includes a processor and memory, etc., for controlling the drive of the film transfer component 110.

4-2. Operation

Figure 7:
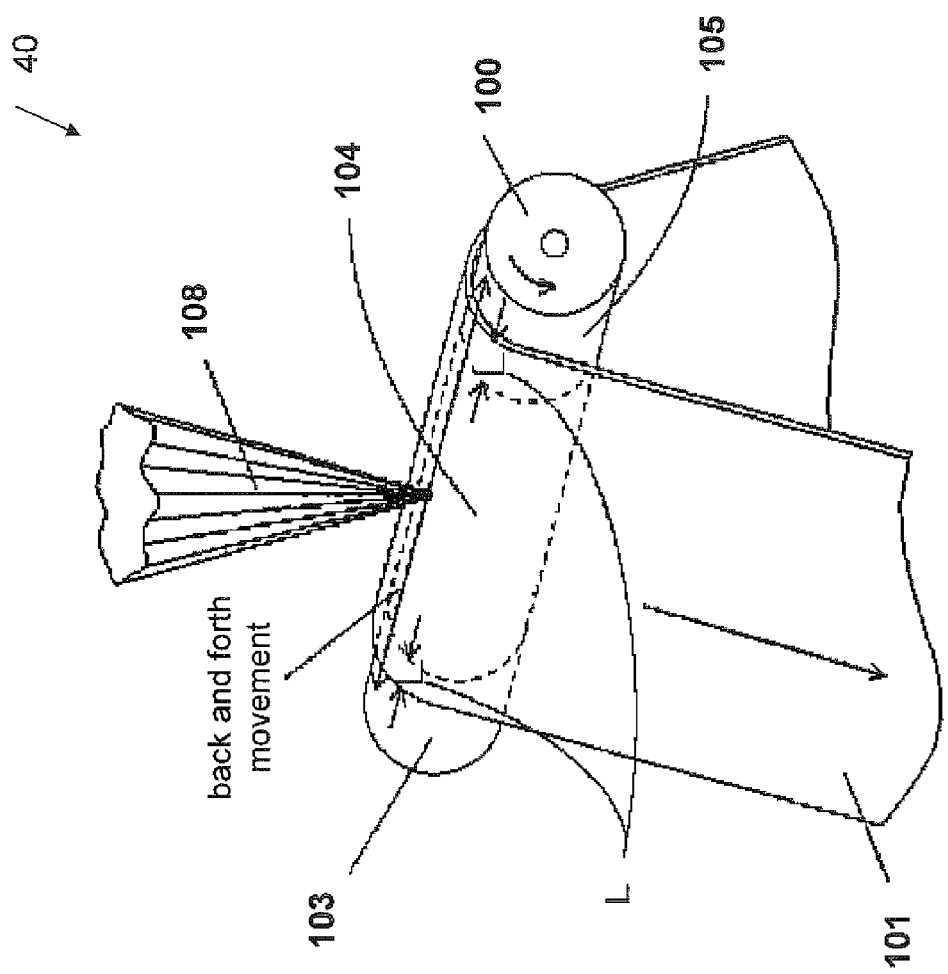
FIG. 7 shows the main components of the laser annealing device in Embodiment 4.

FIG. 7 shows the main components of the laser annealing device 40 in this embodiment. Duplicated description of components that are substantially the same as in Embodiment 1 may be omitted here.

The laser annealing device 40 in this embodiment makes use of the laser spot 108, which moves linearly back and forth at a constant speed in the width direction of the film 101, instead of the line laser beam 102 used in Embodiment 1. The optical pickup 403 converges the laser spot 108, whose focus is controlled at a specific power, on the film 101. At the same time, the optical pickup 403 is moved back and forth linearly and at high speed in the width direction of the film 101 by the head moving mechanism 408 controlled by the laser controller 409.

The configuration of the roller 100 is the same as in Embodiment 1.

The film 101 is moved at a constant speed, and when the laser spot 108 is moved back and forth linearly and at high speed at the same time, the film 101 is heated over its entire surface, just as in Embodiment 1. For example, the width of the film 101 is set to 100 mm, the converged diameter of the laser spot 108 on the film is set to 0.1 mm, the back and forth movement speed is set to 10,000 mm/s, and the feed speed of the film is set to 5 mm/s With the laser annealing device 40 of this embodiment, the laser spot 108 can be controlled so that it passes through the same region on the film 101 a plurality of times to irradiate that region, by adjusting the diameter of the laser spot 108, the back and forth movement speed, or the feed speed of the film, or a combination of those. This control makes it possible to suppress the uneven heating that occurs when there is an intensity variance to the laser spot.

Also, in this embodiment, the laser spot 108 is moved linearly back and forth under the control of the laser controller 409, but it is also possible to perform control so that the laser is emitted in only one direction in the back and forth linear movement and the laser is not emitted during movement in the other direction. This configuration makes possible an even more uniform temperature distribution over the entire region of the film 101.

A galvano scanner may be used in the above-mentioned laser annealing device 40 as a mechanism for moving the laser spot 108 back and forth at high speed.

4-3. Effect, etc.

Again with the laser annealing device 40 in this embodiment, with a thin material such as a film the heat readily escapes to the roller 100 in contact with the back of the film. Since the film 101 near the ends is touching the high thermal conductivity portions 103 and 105 of the roller 100, the heat escapes there more readily than in the middle part touching the low thermal conductivity portion 104, so the temperature of the film 101 is less apt to rise. This configuration prevents thermal damage to the ends of the film 101 that would arise from the edge effect in which the ends become hotter, and therefore the configuration affords uniform annealing of the film 101 over its entire width.

Embodiment 5

This embodiment is a modification example of the laser annealing device 40 in Embodiment 4, and allows the temperature distribution of the film 101 to be kept constant.

Figure 8:
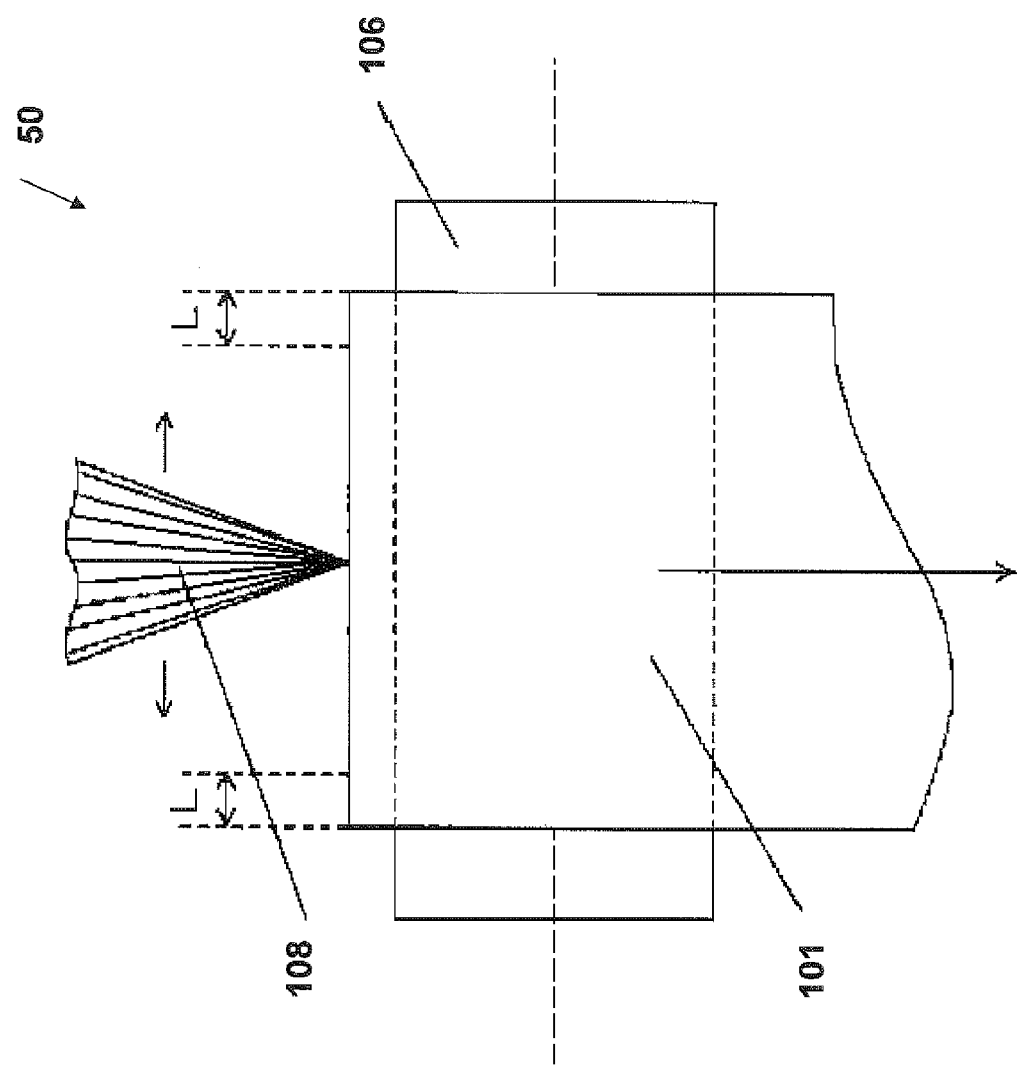
FIG. 8 shows the main components of the laser annealing device in Embodiment 5.

FIG. 8 shows the main components of the laser annealing device 50 in this embodiment. Here, duplicate description of components that are substantially the same as in Embodiment 4 may be omitted.

The laser annealing device 50 in this embodiment differs from Embodiment 4 in having a roller 106 made from a single type of material. The roller 106 is preferably made from a low thermal conductivity material in order to use the laser energy more effectively. The low thermal conductivity material is, for example, a plastic material such as polyacetal with a thermal conductivity of about 0.23 W/(m·k), stainless steel with a thermal conductivity of about 16.7 to 20.9 W/(m·k), or another such material with low thermal conductivity. The laser controller 409 (FIG. 6) controls the laser spot 108 as follows. The laser spot 108 is emitted such that the movement speed with respect to the region near the ends of the film 101, that is, at a distance L (mm) from the ends, is set higher than the movement speed with respect to the middle part. Thus controlling the emission of the laser spot 108 reduces the laser emission duration near the ends of the film 101, which tend to become hotter due to the edge effect, so there is less rise in the temperature at the ends of the film 101, and the temperature distribution can be kept uniform in the width direction of the film 101.

In this embodiment, for example, the width of the film 101 is set to 100 mm, the distance from the ends is set to L=3 mm, the movement speed of the laser beam at the middle part of the film is set to 5000 mm/s, and the movement speed at the film ends is set to 10,000 mm/s.

Also, again in this embodiment, just as in Embodiment 4, the laser spot 108 can be controlled by the laser controller 409 such that it is emitted in only one direction in the back and forth linear movement and the laser spot 108 is not emitted during movement in the other direction. This makes possible an even more uniform temperature distribution over the entire region of the film 101.

Furthermore, just as in Embodiment 4, the laser spot 108 can be controlled so that it passes through the same region on the film 101 a plurality of times to irradiate that region, by adjusting the diameter of the laser spot 108, the back and forth movement speed, or the feed speed of the film, or a combination of those. This control makes it possible to suppress the uneven heating that occurs when there is an intensity variance to the laser spot.

Other Embodiments

Embodiments 1 to 5 were given above as examples of the technology disclosed in this application. However, the technology disclosed herein is not limited to this, and modifications, substitutions, additions, omissions, and so forth can be made in other embodiments. Also, the various constituent elements described in the above Embodiments 1 to 5 can be combined to create new embodiments.

In Embodiments 1 to 5, a roller was given as an example of a film material feed mechanism, but this is not the only option. The film material feed mechanism may be any mechanism in which a film material is placed and is moved in one direction, in the lengthwise direction of the film material. Therefore, the film material feed mechanism is not limited to a roller, and may instead be a conveyor belt or the like on which a film material is placed horizontally and conveyed.

Also, in Embodiments 1 to 5, a laser annealing device was described as a heating apparatus, but these embodiments can also be realized as a heating method in which an elongated film material is heated by being irradiated with a laser beam in the manufacture of a film-form recording medium.

INDUSTRIAL APPLICABILITY

This disclosure can be applied to a film material heating apparatus used in the process of manufacturing a film-form recording medium, such as a magnetic tape or a phase-change recording film.

REFERENCE SIGNS LIST 10 laser annealing device (an example of a heating apparatus)
11 film transfer device
100 roller (an example of a film feed mechanism)
101 film (an example of a film material)
102 line laser beam
103 high thermal conductivity portion (an example of a second contact surface)
104 low thermal conductivity portion (an example of a first contact surface)
105 high thermal conductivity portion (an example of a second contact surface)
106 roller (an example of a film feed mechanism)
107 attenuator plate
108 laser spot
110 film transfer component
111 transfer controller
202 line laser irradiation component (an example of a laser irradiation component)
204 laser light source (an example of a laser light source)
209 laser controller (an example of a laser controller)
403 optical pickup
404 laser light source (an example of a laser light source)
409 laser controller (an example of a laser controller)

What is claimed:

1. A heating apparatus that heats an elongated film material by irradiating the film material with a laser beam in manufacture of a film-form recording medium, said heating apparatus comprising:
a film feed mechanism having a film contact surface that contacts with one surface of the film material, the film feed mechanism being configured to move the film material mounted thereon in a longitudinal direction of the film material;
a laser light source;
a laser irradiation component disposed opposite the film contact surface, the laser irradiation component being configured to emit a laser beam from the laser light source toward the film contact surface; and
a laser controller configured to control emission of the laser beam,
wherein the film contact surface includes a first contact surface and second contact surfaces, a material forming the first contact surface having a different thermal conductivity from a material forming the second contact surfaces,
the second contact surfaces are disposed at positions that come into contact with ends of the film material in a width direction that is perpendicular to the longitudinal direction,
the first contact surface is disposed between the second contact surfaces, and
the material forming the first contact surface has a lower thermal conductivity than the material forming the second contact surface.

2. The heating apparatus according to claim 1,
wherein the laser irradiation component is configured to irradiate the film contact surface with a line laser beam formed so as to expand in the width direction.

3. The heating apparatus according to claim 1,
wherein the laser irradiation component is configured to emit a laser spot, and
the laser controller is configured to control the laser irradiation component so as to move the laser spot back and forth in the width direction.

4. The heating apparatus according to claim 3,
wherein the laser controller is configured to control the laser irradiation component so as to stop laser irradiation during movement in one direction out of the back and forth movement of the laser spot.

5. The heating apparatus according to claim 3,
wherein the laser controller is configured to adjust one or more of a back and forth movement speed of the laser spot, a feed speed of the film material, and a diameter of the laser spot, thereby causing the laser spot to be emitted a plurality of times toward the same region of the film contact surface.

6. A heating apparatus that heats an elongated film material by irradiating the film material with a laser beam in manufacture of a film-form recording medium, said heating apparatus comprising:
a film feed mechanism having a film contact surface that contacts with one surface of the film material, the film feed mechanism being configured to move the film material mounted thereon in a longitudinal direction of the film material;
a laser light source;
a laser irradiation component disposed opposite the film contact surface, the laser irradiation component being configured to emit a laser beam from the laser light source toward the film contact surface; and
a laser controller configured to control emission of the laser beam,
wherein the laser irradiation component is configured to irradiate the film contact surface with a laser spot, and
the laser controller is configured to control the laser irradiation component so that the laser spot moves back and forth at two ends of the film contact surface in a width direction that is perpendicular to the longitudinal direction, at a higher speed than at a middle part of the film contact surface disposed between the two ends.

7. The heating apparatus according to claim 6,
wherein the laser controller is configured to control the laser irradiation component so as to stop laser irradiation during movement in one direction out of the back and forth movement of the laser spot.

8. The heating apparatus according to claim 6,
wherein the laser controller is configured to adjust one or more of a back and forth movement speed of the laser spot, a feed speed of the film material, and a diameter of the laser spot, thereby causing the laser spot to be emitted a plurality of times toward the same region of the film contact surface.

9. A heating method for heating an elongated film material by irradiating the film material with a laser beam in manufacture of a film-form recording medium, said heating method comprising:
  moving the film material in a longitudinal direction of the film material by using a film feed mechanism having a film contact surface that contacts with one surface of the film material and moves the film material mounted thereon in a longitudinal direction of the film material, the film contact surface having a first contact surface and second contact surfaces, a material forming the first contact surface having a different thermal conductivity from a material forming the second contact surfaces, the second contact surfaces being disposed at positions that come into contact with ends of the film material in a width direction, the first contact surface being disposed between the second contact surfaces, and the material forming the first contact surface having a lower thermal conductivity than the material forming the second contact surfaces; and
  irradiating the film material moved by the film feed mechanism with a laser beam.

10. A heating method for heating an elongated film material by irradiating the film material with a laser beam in manufacture of a film-form recording medium, said heating method comprising:
  moving the film material in a longitudinal direction of the film material;
  irradiating the moving film material with a laser spot while moving the laser spot back and forth in a width direction of the film material; and
  irradiating two ends of the film material in the width direction with the laser spot so that the laser spot moves back and forth at a higher speed than at a middle part of the film material disposed between the two ends.

* * * * *